3,296,284
REACTIVE DYES OF THE 1,4-DIAMINO-ANTHRA-QUINONE-2-SULFONIC ACID SERIES
Wolfgang Schoenauer, Riehen, Basel-Stadt, Switzerland, assignor to Sandoz Ltd., also known as Sandoz AG, Basel, Switzerland
No Drawing. Filed Oct. 14, 1964, Ser. No. 403,937
Claims priority, application Switzerland, Sept. 12, 1960, 10,299/60
4 Claims. (Cl. 260—372)

The present application is a continuation-in-part of my application Ser. No. 135,785, filed September 5, 1961, now abandoned.

It relates to water-soluble reactive dyes of the anthraquinone series which correspond to the formula

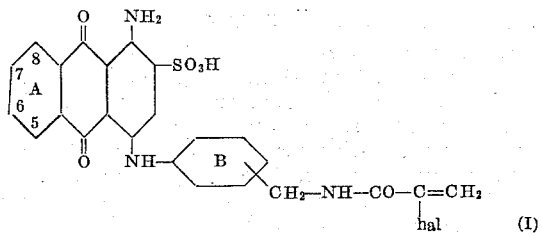

wherein
hal is chlorine or bromine,
the ring A is selected from the group consisting of unsubstituted phenylene, sulfophenylene, bromophenylene, chlorophenylene, dichlorophenylene and fluorophenylene,
and the nucleus B bears one to three substituents selected from the group consisting of lower alkyl and lower alkoxy groups.

In the ring A the sulfonic acid group may be attached to any one of the positions 5, 6, 7 and 8, whereas the halogen atom or atoms may be attached only to one of the positions 6 and 7.

The alkyl and alkoxy substituents of the nucleus B contain 1 to 5 carbon atoms (methyl, ethyl, n-propyl, isopropyl, n-butyl, tert.-butyl, n-amyl, isoamyl, tert.-amyl, methoxy, ethoxy, n-propoxy, n-butoxy and n-amyloxy).

A group of particularly valuable dyes comprises those of the formula

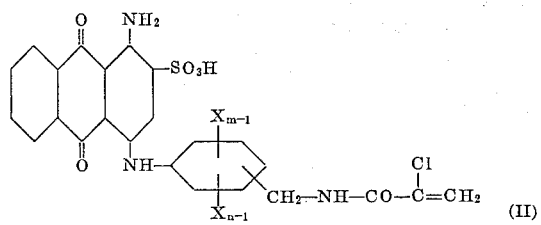

wherein
X is methyl or ethyl,
Y is methoxy or ethoxy,
$m$ is one of the integers 1, 2, 3 and 4, and
$n$ is one of the integers 1 and 2,
the sum $m+n$ is at least 3 and at most 5.

The process for their production consists in reacting an anthraquinone dye of the formula

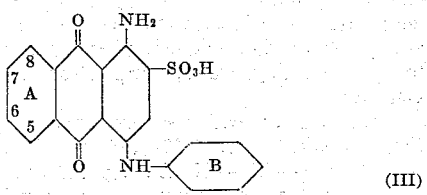

with an α-halogenoacrylic acid-N-methylolamide or N-halogenomethylamide in sulfuric acid solution.

α-Bromo- and especially α-chloro-acrylic acid-N-methylol-amide are examples of the α-halogenoacrylic acid-N-methylol-amides conforming to the invention; they are prepared in known manner by reacting the α-halogenoacrylic acid amides with paraformaldehyde.

The α-bromo- or α-chloro-acrylic acid-N-chloro-methylamide or -N-bromomethylamide are produced by reacting an α-halogenoacrylic acid amide and a symmetrical dihalogenodimethyl ether e.g. in concentrated sulfuric acid and are employed immediately in form of their sulfuric acid solution.

The reaction is carried out in sulfuric acid solution, e.g. in 80% to 100% sulfuric acid, at temperatures of 0° to about 60° C., especially 0° to 30° C., over a period of several hours.

The dyes are isolated e.g. by pouring the sulfuric acid solution onto ice, filtering off the precipitate, washing with a solution of sodium or potassium chloride until the filtrate is neutral and drying.

The dyes so obtained are suitable for dyeing leather; for dyeing, padding and printing fibers of animal origin, e.g. wool and silk; synthetic polyamide fibers, e.g. nylon; cellulosic fibers, e.g. cotton and linen; fibers of regenerated cellulose, e.g. viscose filament yarn, viscose staple fiber and cuprammonium rayon; and mixtures and articles of these fibers. The optimum conditions of application vary with the type of fiber and the dyes used.

Animal and synthetic polyamide fibers are dyed, printed or fixed preferably in an acid, neutral or weakly alkaline medium, e.g. in presence of acetic, formic or sulfuric acid, ammonium sulfate, sodium metaphosphate etc. They can also be applied from acetic acid to neutral medium in presence of levelling agents, e.g. polyoxethylated fatty amines or mixtures of these and alkylpolyglycol ethers, and the bath adjusted to a neutral or weakly alkaline reaction at the end of dyeing by the addition of small amounts of an agent of alkaline reaction, e.g. ammonia, sodium bicarbonate, sodium carbonate etc. or a compound which reacts alkaline on heating, e.g. hexamethylene tetramine or urea. The goods are then rinsed well and if necessary soured with a little acetic acid. The dyeings and prints in general possess good fastness to light, washing, milling, water, perspiration, crocking and dry cleaning.

The dyeing, padding and printing or fixing of the dyes on cellulosic fibers is carried out advantageously in alkaline medium, e.g. in presence of sodium bicarbonate, sodium carbonate, sodium hydroxide solution, potassium hydroxyde solution, sodium metasilicate, sodium borate, trisodium phosphate, ammonia. To prevent reduction effects in dyeing, padding or printing, it is often of advantage to add a mild oxidizing agent, e.g. sodium 1-nitrobenzene-3-sulfonate. As a rule the fixation of the dyes on cellulose fibers also is carried out with heating.

The dyeings and prints on cellulosic fibers possess excellent wet fastness properties, due to the formation of a chemical linkage between the dye molecule and the cellulose molecule. Often the entire amount of dye applied does not take part in the reaction with the fiber; this unreacted dye is removed from the fiber by suitable treatment such as rinsing and/or soaping, if necessary at high temperatures, for which purpose synthetic detergents can be used, e.g. alkylarylsulfonates, sodium lauryl sulfate, sodium laurylpolyglycol ether sulfate, alkylpolyglycol ethers and mono- and dialkyl-phenylpolyglycol ethers, which may be carboxymethylated if desired. The dyeings and prints on the cellulosic fibers possess good fastness to light, washing, water, perspiration, crocking and dry cleaning.

In comparison with the next comparable dyes of the French patent No. 1,222,194 which carry a group —$CH_2$—NH—CO—$CH_2Cl$, e.g. the dye of Example 6, the dyes of the present invention are much more reactive on cellulosic fibers.

In the following examples the parts and percentages are by weight and the temperatures in degrees centigrade.

*Example 1*

10.5 parts of α-chloroacrylic acid amide are dissolved in 75 parts of concentrated 99–100% sulfuric acid at 10–15°. The solution is cooled to 0–5° and 6 parts of dichlorodimethyl ether are added dropwise in 1 hour. After stirring for a further hour at 0–5°, the temperature is increased to 10–15° and stirring continued for 16 hours at this temperature.

6.9 parts of the sodium salt of 1-amino-4-(2′,4′,6′-trimethylphenylamino) - anthraquinone-2-sulfonic acid are dissolved in 140 parts of 96% sulfuric acid. 16.5 parts of the sulfuric acid solution of the condensation product of α-chloroacrylic acid amide and dichlorodimethyl ether described above are added dropwise at 0–10° in about 15 minutes. The mass is stirred for 24 hours at 10–15° and the solution then run onto 400 parts of ice. The precipitate formed is filtered off and washed with a dilute common salt solution until neutral. The filter cake is suspended in water and the pH adjusted to 7 with dilute sodium hydroxide solution. Then the dye is precipitated with common salt, filtered, washed with a dilute common salt solution and dried. It dyes wool blue from a weakly acid bath, the dyeings being very fast to milling.

2 parts of this dye, 0.8 part of an oxyethylated fatty amine and 0.5 part of an oleylpolyglycol ether are dissolved in 5000 parts of water, and 2 parts of glacial acetic acid are added to the solution. This dyebath is heated to 40–50° and at this temperature 100 parts of wool are entered. The bath is brought to the boil in 30 minutes and maintained at the boil for 45 minutes, after which the wool is rinsed and dried. A level blue dyeing very fast to light and wet treatments is obtained. If the dyebath is neutralised with ammonia on completion of dyeing and the goods treated in it for 20 minutes at 90°, a dyeing of slightly better wet fastness is obtained. However the same result can be obtained by aftertreating the dyed goods for 20–30 minutes in a fresh bath of 5000 parts of water and 3 parts of hexamethylene tetramine at 90–95°.

2 parts of dye are dissolved in 3000 parts of soft water at about 30°; 100 parts of mercerized cotton sateen are entered in this solution which is brought to 90° in the course of about 30 minutes. 180 parts of calcined sodium sulfate are added in 4 portions at 30°, 50°, 70° and 85° and 45 parts of calcined sodium carbonate at 90°. Then the dyebath is maintained for 1 hour at 90–95°. After removal of the dyed cotton the dye content of the liquor is determined by colorimetry.

In order to remove the non-fixed portion of dye, the dyed cotton is washed for 20 minutes at the boil in 3000 parts of water containing 1.5 parts of a carboxymethylated alkylpolyglycol ether and 1.5 parts of calcined sodium carbonate. The washed dyeing is removed and the amount of dye in the solution is determined by colorimetry.

The fixation yield amounts to 21%. The blue dyeing is fast to light, washing, water, perspiration, crocking and dry cleaning.

The same dyeing procedure carried out with the dye of Example 6 of the French Patent 1,222,194 which bears a chloroacetylaminomethyl group instead of the α-chloroacryloylaminomethyl group leads to a fixation yield of only 10.7%.

*Example 2*

6.7 parts of sodium 1-amino-4-(2′,6′-dimethylphenylamino)-anthraquinone-2-sulfonate are dissolved in 140 parts of 96% sulfuric acid at 10–20°. To this solution are added in about 15 minutes 2.5 parts of α-chloroacrylic acid-N-methylolamide and the mass is then stirred for 24 hours at 10–20°. The solution is poured onto 400 parts of ice and isolated as described in Example 1. The thus produced dye is very similar to that of Example 1 and dyes wool and cotton in blue shades fast to light and to wet treatments.

By replacing the 2.5 parts of α-chloroacrylic acid-N-methylolamide by 3.3 parts of α-bromoacrylic acid-N-methylolamide, a similar dye is obtained.

*Example 3*

6.7 parts of sodium 1-amino-4-(4′-methoxyphenylamino)-anthraquinone-2-sulfonate are dissolved at 5–10° in 150 parts of 95% sulfuric acid. After cooling to 0°, 16.5 parts of the sulfuric acid solution of the condensation product of α-chloroacrylic acid amide and dichlorodimethyl ether described in Example 1 are added dropwise at 0–5° in about 15 minutes. The temperature is maintained at 0° for two hours and subsequently the mass is stirred for 20 hours at 10–15°. The dye is isolated in the manner described in Example 1; it dyes wool in blue shades fast to light and to wet agencies.

By replacing the condensation product of α-chloroacrylic acid amide with dichlorodimethyl ether by that of α-bromoacrylic acid amide with dichlorodimethyl ether a very similar dye is produced.

The following table contains further dyes obtained according to the particulars of Examples 1 to 3. They correspond to the formula

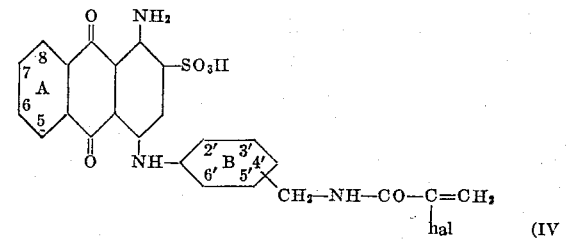

and are characterized by the phenylene radical A (column (I)) by the phenyl radical

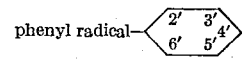

to which the reactive radical

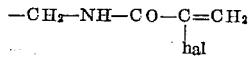

is attached (column (II)), the halogen atom present in the said reactive radical (column (III)) and the shade of the dyeings or prints on wool or on cotton (column (IV)). The radical

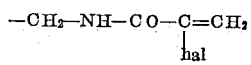

is attached to the nucleus B in a position vicinal to an alkyl or alkoxy group.

TABLE

| Example No. | (I) | (II) | (III) | (IV) |
|---|---|---|---|---|
| 4 | Phenylene | 4'-methylphenyl | Cl | Greenish blue. |
| 5 | ----do---- | 2',4'-dimethylphenyl | Cl | Do. |
| 6 | 6-sulfophenylene | ----do---- | Cl | Do. |
| 7 | ----do---- | 2',4',6'-trimethylphenyl | Cl | Blue. |
| 8 | ----do---- | ----do---- | Br | Do. |
| 9 | 6-fluorophenylene | ----do---- | Cl | Reddish blue. |
| 10 | 6-chlorophenylene | ----do---- | Cl | Blue. |
| 11 | 6,7-dichlorophenylene | ----do---- | Cl | Do. |
| 12 | 6-bromophenylene | ----do---- | Cl | Do. |
| 13 | 5/8-sulfophenylene | 2',4',6'-triethylphenyl | Cl | Do. |
| 14 | 7-sulfophenylene | ----do---- | Cl | Do. |
| 15 | ----do---- | 2'-methyl-4',6'-diethylphenyl | Cl | Reddish blue. |
| 16 | Phenylene | ----do---- | Cl | Do. |
| 17 | ----do---- | 4'-ethylphenyl | Cl | Greenish blue. |
| 18 | ----do---- | 4'-isopropylphenyl | Cl | Do. |
| 19 | ----do---- | 2',5'-dimethylphenyl | Cl | Do. |
| 20 | ----do---- | 4'-tert.-butylphenyl | Cl | Do. |
| 21 | ----do---- | 4'-tert.-amylphenyl | Cl | Do. |
| 22 | 5/8-sulfophenylene | ----do---- | Cl | Do. |
| 23 | ----do---- | 2'-methyl-4'-n-butyl-phenyl | Br | Do. |
| 24 | 6-sulfophenylene | ----do---- | Cl | Do. |
| 25 | Phenylene | ----do---- | Cl | Blue. |
| 26 | ----do---- | 2',4'-dimethyl-6'-ethylphenyl | Cl | Reddish blue. |
| 27 | ----do---- | 4'-ethoxyphenyl | Cl | Greenish blue. |
| 28 | ----do---- | 4'-n-propoxyphenyl | Cl | Do. |
| 29 | ----do---- | 2'-methoxy-5'-methyl-phenyl | Cl | Blue. |
| 30 | ----do---- | 2',5'-dimethoxyphenyl | Cl | Do. |
| 31 | ----do---- | 2'-methoxyphenyl | Cl | Do. |
| 32 | ----do---- | 2',6'-dimethyl-4'-n-butylphenyl | Cl | Reddish blue. |
| 33 | 6-sulfophenylene | ----do---- | Cl | Blue. |
| 34 | ----do---- | 4'-n-amyloxyphenyl | Cl | Greenish blue. |
| 35 | Phenylene | 4'-isoamylphenyl | Cl | Do. |
| 36 | ----do---- | 4'-n-butylphenyl | Cl | Do. |
| 37 | ----do---- | 2',5'-diethoxyphenyl | Cl | Blue. |
| 38 | ----do---- | 4'-n-propylphenyl | Cl | Greenish blue. |
| 39 | ----do---- | 2',6'-dimethylphenyl | Cl | Reddish blue. |
| 40 | 5-sulfophenylene | ----do---- | Cl | Blue. |
| 41 | 6-fluorophenylene | ----do---- | Cl | Do. |
| 42 | 6-bromophenylene | ----do---- | Cl | Do. |
| 43 | 7-chlorophenylene | ----do---- | Cl | Reddish blue. |
| 44 | 6,7-dichlorophenylene | ----do---- | Cl | Blue. |
| 45 | Phenylene | 2'-ethoxy-5'-methylphenyl | Cl | Greenish blue. |
| 46 | ----do---- | 4'-n-butoxyphenyl | Cl | Do. |
| 47 | 8-sulfophenylene | 2',4',6'-trimethylphenyl | Br | Blue. |
| 48 | Phenylene | 2',4-diethoxyphenyl | Cl | Greenish blue. |
| 49 | ----do---- | 2'-methyl-4'-methoxyphenyl | Cl | Do. |
| 50 | ----do---- | 2'-methyl-5'-methoxyphenyl | Cl | Do. |

Formulae of representative dyes of the foregoing examples are as follows:

*Example 1*

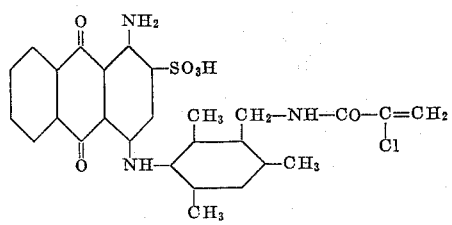

*Example 2*

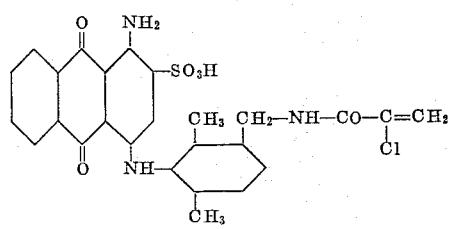

*Example 3*

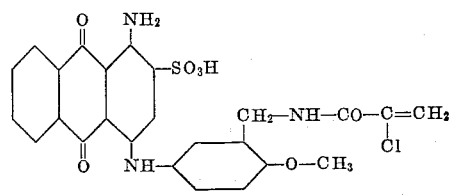

Having thus disclosed the invention, what I claim is:

1. An anthraquinone dye of the formula

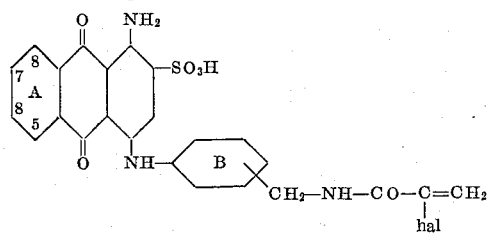

wherein
hal is a halogen atom selected from the group consisting of chlorine and bromine,
the ring A is selected from the group consisting of unsubstituted phenylene, sulfophenylene, fluorophenylene, bromophenylene, chlorophenylene and 6,7-dichlorophenylene, the single halogen atom being attached to one of the positions 6 and 7, and sulfo being attached to one of the positions 5, 6, 7 and 8, and the nucleus B bears one to three substituents selected from the group consisting of lower alkyl and lower alkoxy,
and the group

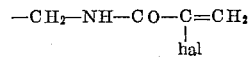

being bound in ortho-position to a substituent of the nucleus B.

2. An anthraquinone dye of the formula

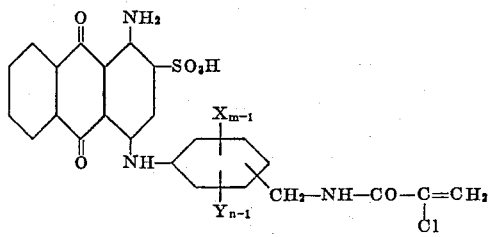

wherein
X is a member selected from the group consisting of methyl and ethyl,
Y is a member selected from the group consisting of methoxy and ethoxy
$m$ is one of the integers 1, 2, 3 and 4,
and $n$ is one of the integers 1 and 2,
the sum $m+n$ is at least 3 and at most 5.

3. The anthraquinone dye of the formula

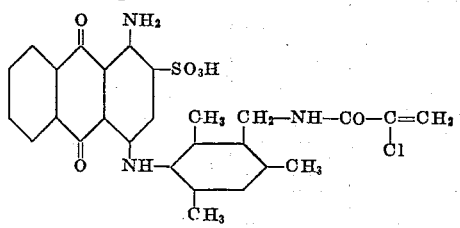

4. The anthraquinone dye of the formula

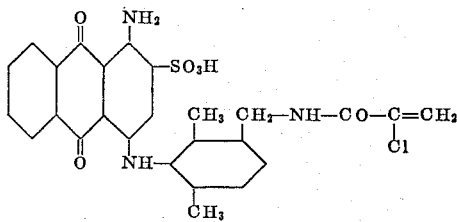

References Cited by the Examiner
FOREIGN PATENTS

| | | |
|---|---|---|
| 1,200,241 | 6/1959 | France. |
| 1,222,194 | 1/1960 | France. |
| 1,238,515 | 7/1960 | France. |
| 830,876 | 3/1960 | Great Britain. |

LORRAINE A. WEINBERGER, *Primary Examiner.*
R. K. JACKSON, H. C. WEGNER,
*Assistant Examiners.*